United States Patent [19]

Bish et al.

[11] 4,421,809
[45] Dec. 20, 1983

[54] FLOOR MAT WITH FLOCK FIBERS ADHESIVELY BONDED ONTO A THIN POLYMERIC FILM

[75] Inventors: Steven S. Bish, Reading; Paul J. Sagel, Cincinnati; Toan Trinh, Maineville, all of Ohio

[73] Assignee: The Procter & Gamble Company, Cincinnati, Ohio

[21] Appl. No.: 420,426

[22] Filed: Sep. 20, 1982

[51] Int. Cl.³ .............................................. B05D 1/14
[52] U.S. Cl. ...................................... 428/90; 428/95; 428/297; 428/317.1; 428/317.3; 428/333; 428/339; 428/343; 428/354; 428/355
[58] Field of Search ................... 428/90, 95, 343, 354, 428/96, 97, 297, 333, 339, 355, 317.1, 317.3

[56] References Cited

U.S. PATENT DOCUMENTS

| | | | |
|---|---|---|---|
| 3,434,858 | 3/1969 | Dickinson | 428/92 |
| 3,536,515 | 10/1970 | Spellman et al. | 428/90 |
| 3,591,401 | 7/1971 | Snyder et al. | 428/90 |
| 3,684,637 | 8/1972 | Anderson et al. | 428/904 |
| 3,856,026 | 12/1974 | Gaydos | 428/90 |

OTHER PUBLICATIONS

Latexes in Adhesive Systems (AB 1.701) B. F. Goodrich Chem. Co., 1982 (Cover, pp. 2, 3, 37-44).
AATCC Symposium-Flock Technology, Dec. 8-9, 1971, Wash., D.C., American Assoc. of Textile Chemists & Colorists (Cover, pp. 54-58 & 87-90).

*Primary Examiner*—James J. Bell
*Attorney, Agent, or Firm*—Richard C. Witte; Leonard Williamson

[57] ABSTRACT

Disclosed in an article comprising flock fibers adhesively bonded to a thin, heat stable, flexible, water-impermeable, polymeric film. The preferred article is a flocked floor mat with good water and wet soil absorbency and door clearance: a preferred mat comprises short fibers bonded, with a hydrophilic adhesive, to the thin polymeric film which in turn is preferably laminated to a thin foam secondary backing.

11 Claims, 1 Drawing Figure

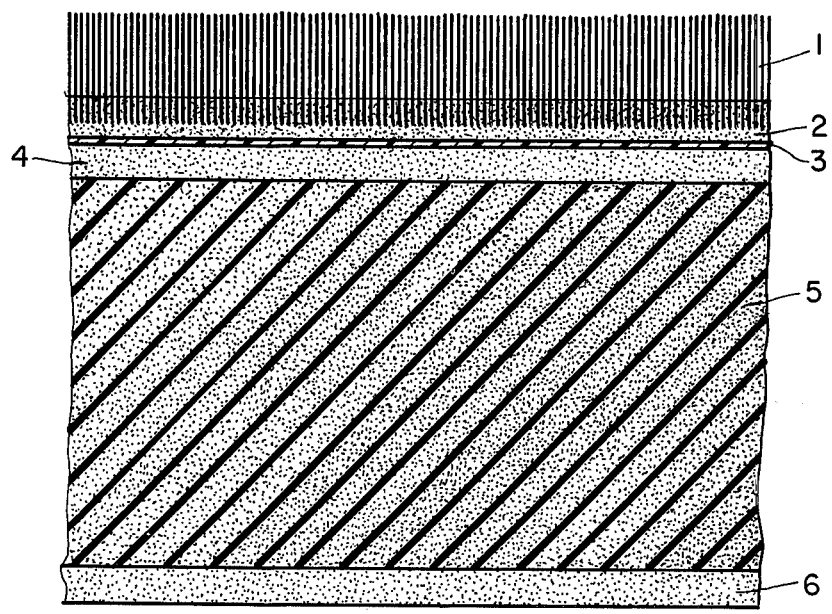

FLOOR MAT WITH FLOCK FIBERS ADHESIVELY BONDED ONTO A THIN POLYMERIC FILM

BACKGROUND OF THE INVENTION

This invention relates to fiber flocked articles and more specifically to thin flocked floor mats.

In general, both the consumers and flooring manufacturers are concerned with the negative impact of soiling on the appearance of floors and carpets. Carpet manufacturers take many steps to minimize the detractive appearance of soils on carpets through careful selection of fibers, soil release finishes, and colors to either make soils easy to remove or hide their presence. Consumers also employ means to minimize the effects of soiling on their floors and carpets by frequency vacuuming and sweeping to retrieve soils. Another means for preserving floor appearance is to trap soils before they are transferred via foot traffic onto permanent floors and carpets. Often this is done with the use of floor mats.

Flocked carpets are known in the art. Flocked mats per se are effective for removing dry soils from the bottom of shoes. Wet soils, however, are another problem. The contact time during which absorption of wet soils takes place is often very short. It is desirable that these floor mats have good wet soil absorption rates such that wet soils can be absorbed from the bottom of a person's shoes during this short time. Commonly owned U.S. patent application Ser. No. 316,477, filed Oct. 30, 1981, P. J. Sagel, discloses a flocked floor mat with an immobile surfactant on the fibers to improve wet soil absorbency of otherwise hydrophobic flocked fabric. U.S. Ser. No. 316,477 is incorporated herein by reference in its entirety.

Flocking onto rubber with a cement to make a contoured floor mat is disclosed in U.S. Pat. No. 2,801,946, Aug. 6, 1957, J. H. Winchester and W. S. Edwards. Flocking onto a breathable polyvinyl chloride film is disclosed in U.S. Pat. No. 3,434,858, Mar. 25, 1969, S. C. Dickinson.

Special attention is directed to the references set out in *Flocked Materials Technology and Applications,*" 1972, by E. L. Barden, published by Noyes Data Corporation; *AATCC Flock Handbook*, R. G. Weyker, Editor, published by the American Association of Textile Chemists and Colorists, 1972; and *AATCC Symposium, Flock Technology*, Washington, D.C., Dec. 8-9, 1971, published by American Association of Textile Chemists and Colorists, 1972, P.O. Box 12215, Research Triangle Park, N.C. 27709.

SUMMARY OF THE INVENTION

The present invention is a fiber flocked, water-impermeable, thin polymeric film article. The preferred embodiment is a flocked floor mat comprising short fibers bonded with a hydrophilic adhesive to the thin polymeric film which in turn is laminated to a foam backing. The floor mat has good wet soil absorbency due to the hydrophilic adhesive. The polymeric film is water-impermeable, which protects the floor from moisture strike through.

It is an object of the present invention to provide a floor mat which is highly effective for wet and dry soil removal. Another object is to provide a thin yet structurally strong floor mat which has good door clearance. Yet another object is to provide a floor mat which is stable on both hard floors and carpeted surfaces. Still another object is to provide a floor mat with cushioning backing for foot comfort. Another object is to provide a floor mat with a water-absorbent top and a water-impermeable backing.

BRIEF DESCRIPTION OF THE DRAWING

The FIGURE is a cross-sectional view of a preferred embodiment of the present invention illustrating its composition; the six elements are flock fibers 1, flocking adhesive 2, thin polymeric film primary backing 3, laminating adhesive 4, foam secondary backing 5, and pressure sensitive adhesive coating 6.

DESCRIPTION OF THE INVENTION

The essentials of the present invention are: (1) flock fibers, (2) a flocking adhesive, and (3) a thin polymeric film backing with the flock fibers bonded thereto with the flocking adhesive. A preferred embodiment of this invention is shown in the drawing which is referred to from time to time herein.

The preferred embodiment of the present invention is a flocked floor mat comprising short flock fibers 1, a hydrophilic flocking adhesive 2, and a thin polymer film primary backing 3. A preferred embodiment also includes a thin secondary backing 5 which is attached to the polymeric film primary backing 3 using a laminating adhesive 4. A porous thin foam sheet is a preferred secondary backing material. Another preferred optional element is a pressure sensitive adhesive coating 6 on the back of the mat secondary backing to improve hard floor stability. Other optional elements (not shown), such as flame retardant, antimicrobial and antifungal agents, antistatic agents, perfumes, printing inks and dyes, can also be used for added benefits.

It is important that the floor mats of this invention be flexible, i.e, have a "drape," such that the mat readily conforms to the contours of flooring.

THE FLOCK FIBERS

Fibers are essential to the present invention. In the present invention the flock fibers 1 can include those made of nylon, acrylic, modacrylic, polyester, rayon and other suitable materials. The fibers may be either random cut or precision cut. In the case of electrostatic flocking or a combination of electrostatic and mechanical flocking, the fibers are treated with a finish which promotes the ability to accept and transfer electrical charge. Flock fibers of from 1.5 to 80 denier and of lengths from 0.4 mm to 10 mm are flocked at a flock coverage of from about 1,000 to about 40,000 fibers per square centimeter. Preferred fibers used in this embodiment are those of 2 denier to 20 denier and of length from 0.75 mm to 2.5 mm at a flock density of from 8,000 to 30,000 fibers per square centimeter. The most preferred fibers are those of 2 to 4 denier and of lengths from 0.75 mm to 1.0 mm at a flock density of from 15,000 to 25,000 fibers per square centimeter.

THE FLOCKING ADHESIVE

Hydrophilic and nonhydrophilic flocking adhesives can be used to bond the flock fibers to the thin polymeric primary backing. Suitable flocking adhesives can be compounded using commercially available polymeric resins, such as those disclosed in B. F. Goodrich L-14 Bulletin, pages 37 and 38, incorporated herein by reference. Suitable resin emulsions include polyvinyl acetate, polyacrylic, polyvinyl chloride, and polyurethane.

The flocking adhesive 2 of the present invention is preferably hydrophilic. Although this embodiment of the instant invention is not limited to any particular theory or mechanism, it is believed that a hydrophilic flocking adhesive 2 contributes to the moisture absorption performance—which includes the removal of water from shoe soles and the prevention of reverse transfer of water back to shoe soles—by promoting the radial transport of the absorbed water. Water from shoe soles is removed and transferred to the mat by capillary action of the flock fibers. A hydrophobic adhesive layer confines this water to the original area of application, with slow radial spreading because of preferential vertical wicking action of the vertically oriented flock and the nonwetability of the base. On the other hand, an adhesive with good wetting property promotes a rapid radial spreading of the water away from the water application area, and thus the mat can absorb more water, and the absorbed water is kept deep under the flock layer open surface, therefore, the reverse transfer of water back to shoe soles is minimized.

Hydrophilicity of a flocking adhesive is determined by measuring the water contact angle of an adhesive film cured at the same conditions which are required in the mat manufacture. An adhesive is considered hydrophilic if the water contact angle on its film surface is equal or smaller than 70°. An adhesive is considered hydrophobic if the water contact angle on its film surface is greater than 70°. This is explained in detail below.

The following experimental procedure is used to make adhesive films and to determine the hydrophilicity (water contact angle) of the flocking adhesive: (1) An amount of about 0.5 ml of uncured adhesive is deposited on a glass microscope slide of dimension 7.5 cm × 2.5 cm. (2) The adhesive is spread with a spatula into a smooth film which covers the surface of the slide, with care taken in order to avoid the formation of bubbles on the adhesive film. (3) The adhesive film on glass slide is then placed in an oven at a temperature and time duration required for curing the adhesive as in mat making. (4) The water contact angle of a flocking adhesive is determined by depositing a droplet of distilled water on a smooth area of the adhesive film surface and measuring its contact angle on a Rame-Hart Contact Angle Goniometer, Model A-100. The droplet is about 0.005 ml of the distilled water and is deposited using a microsyringe. The contact angle is measured 30 seconds after the droplet is deposited on the film. Four replicates are obtained and the mean value is calculated.

The hydrophilic flocking adhesive useful herein is defined as one which has a water contact angle as measured by the above procedure of from 0° to 70°, preferable from 0° to 50°, and more preferably from 0° and 40°. The adhesive are usually compounded using a polymeric resin emulsion, a thickener, and a curing catalyst. Suitable hydrophilic polymeric resin emulsions include, but are not limited to, some water-based polyacrylic, polyvinyl acetate, polyvinyl chloride, and polyacrylonitrile emulsions. Some other useful additives include thermosetting resins, defoamers, humectants, pigments, and flame retardants. Some commercially available resin emulsions which can be used to prepare hydrophilic adhesives are Emulsion E-821 and Emulsion E-751 acrylic latexes, manufactured by Rohm and Haas Company, and Hycar ®2671 nitrile latex, Geon ®351 and Geon ®576 vinyl chloride latexes, produced by B. F. Goodrich Company. Some polymeric resins are themselves hydrophilic. Other resins can contain effective amount of materials such as surfactants to give their film surfaces wetability.

The following examples are given for purposes of illustration only and are not to be interpreted as necessarily limiting the invention. In Examples I and II, ingredients are added with mixing in the order listed, until a creamy mixture is obtained.

EXAMPLE I

| Raw Materials and Sources | Parts Product |
| --- | --- |
| Emulsion E-821 Acrylic Latex (60% solids) (Rohm and Haas Co.) | 900 |
| Acrylsol ® ASE-60 Polyacrylic Acid Thickener (28% solids) (Rohm and Haas Co.) further diluted with equal weight of water | 39 |
| $NH_4NO_3$ (25% aqueous solution) Catalyst (Fisher Scientific Co.) | 18 |
| $NH_4OH$ (28% aqueous solution) Neutralizer (Fisher Scientific Co.) | Until pH of mixture is 8.5 |

The flocking adhesive of Example I, when made into film and cured at 121° C. for 10 min. according to the above-described procedure, has a water contact angle of 29°±6° which denotes that it is hydrophilic.

EXAMPLE II

| Raw Materials and Sources | Parts Product |
| --- | --- |
| Rhoplex ® NW-1345 Acrylic Resin (45.5% solids) (Rohm and Haas Co.) | 900 |
| Acrysol ® ASE-60 Polyacrylic Acid Thickener (28% solids) (Rohm and Haas Co.) further diluted with equal weight of water | 78 |
| $NH_4NO_3$ (25% aqueous solution) Catalyst (Fisher Scientific Co.) | 18 |
| $NH_4OH$ (28% aqueous solution) Neutralizer (Fisher Scientific Co.) | Until pH of mixture is 8.5 |

The flocking adhesive of Example II, when made into film and cured at 121° C. for 10 min. according to the above-described procedure, has a water contact angle of 87°±2° which is hydrophobic.

The flocking adhesive 2 is applied to the polymeric film primary backing 3 at a thickness of from about 0.1 mm and up; preferably from 0.1 mm to 1.5 mm; and more preferably from 0.1 mm to 0.5 mm.

THE PRIMARY BACKING

Primary backing 3 can be made of thin polymeric films, as well as woven and nonwoven substrates.

It is essential that the polymeric film used as the primary backing 3 is one which is dimensionally stable under flocking adhesive curing conditions. Suitable curing methods include, but are not limited to, heat cure, microwave, ultraviolet light and electron beam radiation. The preferred curing condition for most acrylic adhesives is heating in a forced air oven at a temperature of from about 120° C. to about 150° C. for about 2 to 20 minutes; the higher the temperature the flock-adhesive-film structure is exposed to, the shorter is the time required to achieve the cure.

A preferred curing method is to dry the adhesive in a forced air oven for about 3 to 10 minutes at a temperature of from 100° C. to 110° C. and then achieve a final cure in the forced air oven at 135° C. to 140° C. in 2 to 10 minutes.

The selection of a suitable polymeric film material for the primary backing is a key to the practice of the present invention. Many polymeric films are unsuitable because they deform, and/or shrink, when exposed to such high temperatures used for curing. Also polymeric films which are stiff are unsuitable. Polymeric film material suitable for the primary backing 3 includes, but is not limited to, polycarbonate, nylon, polyester, and polypropylene. The film thickness is at least 0.005 mm. The preferred film thickness is from 0.01 mm to 0.75 mm; the most preferred thickness is from 0.01 mm to 0.03 mm. It is important to note that the film used for the primary backing 3 must also withstand time and temperature conditions for other treatments, such as laminating it to the secondary backing 5, curing the pressure sensitive adhesive coating 6, or affixing printing inks to the flock fibers 1.

Some nonwoven substrates preferred for the primary backing are fabrics selected from the group consisting of acrylic, rayon, cotton, nylon, polyester, lower polyolefin, and paper materials having a basis weight of from 1 mg/cm$^2$ to 30 mg/cm$^2$. More preferred backings have basis weights of from 5 mg/cm$^2$ to 25 mg/cm$^2$, and the most preferred are from 5 mg/cm$^2$ to 15 mg/cm$^2$.

In general, thin polymeric films and nonwoven substrates each have their advantages as primary backing material. One advantage of thin films is less film material is usually needed than nonwoven material. Namely, the most preferred embodiment calls for from 1 mg/cm$^2$ to 4 mg/cm$^2$ basis weight for film material vs. from 5 mg/cm$^2$ to 15 mg/cm$^2$ basis weight for the nonwoven material. Another advantage of thin film primary backing is less flocking adhesive is needed. There is substantial flocking adhesive penetration into the porous nonwoven substrate and none in the film. Furthermore, the water impermeability of the film prevents potential moisture strike through.

On the other hand, the nonwoven primary backing usually provides more structural strength and durability for a flocked floor mat than one made with a thin film.

THE LAMINATING ADHESIVE

Any suitable adhesive can be used for laminating the primary backing 3 to the secondary backing 5. The adhesives disclosed as flocking adhesives can also be used for laminating adhesive 4. It is applied at a level suitable to attach the primary backing 3 to the secondary backing 5. It is noteworthy that for door clearance and cost considerations, it is preferable to use a thin primary backing 3 and a thin foam secondary backing 5. Taken separately, these two thin backings are usually not structurally strong enough to withstand the normal pedestrian traffic. However, the lamination of these two backings, with the added resiliency provided by the flocking adhesive 2 and the laminating adhesive 4, makes the mat resistant to wear and retain its integrity.

Alternatively, it is acceptable to affix the primary backing to the secondary backing using heat welding, spot heat welding, radio frequency sealing, solvent welding, or other suitable laminating methods well known in the art.

THE SECONDARY BACKING

The secondary backing 5 can be rigid or and suitable flexible sheet material. Preferably, the secondary backing 5 is a flexible polymeric foam sheet having a thickness greater than or equal to 0.5 mm. The preferred backing thickness is from 1.0 mm to 10 mm, and the most preferred backing thickness for the present invention is from 1.5 mm to 4 mm. The preferred secondary backing material is a polyurethane ether or ester foam sheet having a density of from about 0.015 g/cm$^3$ to about 0.05 g/cm$^3$ and having from about 20 to about 40 pores per linear centimeter. A more preferred foam density is 0.017 g/cm$^3$ to 0.03 g/cm$^3$. The most preferred materials for backing 5 are those having open-cell foam structure. The open cells provide less surface area for the applied pressure sensitive adhesive and a mechanical means for carpeted floor stability. It is believed that the open cells in the preferred foam secondary backing 5 provide openings into which carpet yarn fibers penetrate. The frictional forces between the yarn fibers and the foam cells provide resistance to movement parallel to the floor surface keeping the floor mat in place when walked down.

THE PRESSURE SENSITIVE ADHESIVE

The pressure sensitive adhesive (PSA) coating 6 located on the back of the mat is a preferred optional element. A PSA coating 6 is applied to the mat surface which is in contact with the floor. The preferred PSA's are those which provide an adequate level of tack for the mat to remain in place during normal traffic use (see Floor Stability below), but which can be separated easily by peeling action when mat removal is desired. The PSA should remain attached to the mat backing surface with little or no transfer to the floor surface when the mat is removed from the floor. The PSA should also remain active during the life of the product. It is critical that the nature and amount of PSA are well chosen to deliver the above-described properties. It is preferable to "kiss coat" the PSA onto the floor contact side of the secondary backing to keep the PSA primarily on the outer "tips" of flexible backing material. A common kiss coating technique is effected by applying a thin layer of the PSA onto an intermediary surface and then to the secondary backing. The following is an example of a suitable PSA composition.

EXAMPLE III

| Raw Materials and Sources | Weight % |
| --- | --- |
| Hycar 2600X207 Acrylic Latex (50% solids) (B. F. Goodrich Co.) | 97.5 |
| Carboset XL-46 Acrylic Tackifier (50% solids) (B. F. Goodrich Co.) | 1.0 |
| NH$_4$OH (28% aqueous solution) | 1.5 |
| | 100.0% |

The above PSA is "kiss coated" on the foam secondary backing 5 at a level of about 4 g/m$^2$ and cured at 150° C. for 3 minutes. In general, the preferred PSA application level on the secondary backing 5 is of from 2 g/m$^2$ to 12 g/m$^2$. The most preferred PSA level is of from 2 g/m$^2$ to 6 g/m$^2$.

WATER ABSORPTION AND DISSIPATION

The water absorption and dissipation performance of a flocked mat can be evaluated most readily with a "water drop test," namely, a drop of distilled water is deposited on the flocked mat surface and the dissipation time (disappearance of the drop) measured. As an illustration, two mat samples were made with precision-cut modacrylic fibers of 0.9 mm length and 3 denier flocked onto a polyester nonwoven substrate. The flock fibers were obtained from Cellusuede Products, Inc., Rockford, Ill. The nonwoven substrate was Confil ® 1120F, 8.9 mg/cm² basis weight, obtained from International Paper Company, Formed Fabrics Division, Lewisburg, Pa. The hydrophilic flocking adhesive of Example I was used in one sample, and the hydrophobic flocking adhesive of Example II was used in the other sample. Both samples were cured at 121° C. for 10 minutes. The water drop test showed that the sample with hydrophilic adhesive absorbed and dissipated the water drop very well, with the drop disappearing almost instantaneously. On the other hand, the sample with hydrophobic adhesive absorbed water poorly, with the water drop confined to the area of application, and remained visible after a few seconds.

FLOOR STABILITY

The combination of an open-cell foam secondary backing 5 and the pressure sensitive adhesive 6 in the preferred embodiment provides mat floor stability on hard floors and carpeted floor surfaces. One way to determine the "floor stability" is by measurement of the coefficient of friction (COF) of the mat on floor surfaces. The coefficient of friction of a mat sample on a floor surface is equal to the force parallel to the floor needed to dislodge the sample divided by the force normal to the sample and the floor surface. To determine the coefficient of friction, one uses a table-top Instron ® Model 1102, manufactured by Instron Corp., Canton, Mass. 02021. The instrument has a horizontal plate attached, with a free wheeling pulley and a cable with a 207 gm plate. To determine the COF on hard floor surface, the instrument is modified by clamping a flat, smooth-surfaced vinyl asbestos tile to the horizontal plate. The floor tiles used are one square foot Kentile Reinforced Vinyl Asbestos Tiles, 514M White Beaux Arts Series (Kentile Floors, Inc., Chicago, Ill. 60632). The tiles are precleaned by wiping with an isopropanol-impregnated paper towel. A 6.4 cm × 6.4 cm test sample is cut from a larger mat and conditioned at 22.8° C. for 24 hours. The 207 gm plate is taped to the flocked surface, and placed at the far edge of the tile. To complete test preparation, the cable is placed through the pulley grooves and connected to the Instron ® load cell sensor. To test the sample, one lowers the table at a rate of 2.54 cm/min. for 8 minutes. The Instron instrument records the force required to dislodge the sample. As it moves across the tray many dislodgings occur and an average value of the force is estimated. This test is repeated once each week for 4 weeks. The preferred PSA provides a mat with a COF of from about 1.0 to about 8.0, preferably from about 1.5 to about 6.5, and most preferably from about 2.0 to about 5.0, as measured on flat, smooth vinyl asbestos tiles. The carpet stability of the mat is determined in a similar manner except that the tile is replaced with short loop carpet and with shag carpet. Another difference is that the tests are made only once. The COF of a mat on short loop and shag carpet should fall preferably within the ranges given for the mat on vinyl asbestos tile.

MAT THICKNESS

The preferred floor mat of this invention is thin in order to have good door clearance. The preferred thickness is 15 mm or less. The more preferred thickness is from 2 mm to 10 mm. The most preferred thickness is 5 mm or less. The thickness of the floor mat can be estimated from its elements by adding the fiber 1 length, the thickness of the flocking adhesive layer 2, the thickness of the film primary backing 3, and the thickness of the foam secondary backing 5, then adjusted for the fact that about 25% of the fiber 1 length is embedded in the flocking adhesive 2, and that the thickness of the flocking adhesive layer 2 is reduced to its percentage of solid content. The laminating adhesive 4 and the pressure sensitive adhesive 6 are excluded from the estimation because their thicknesses are negligible. For example, a floor mat constructed with precision cut flock fibers of 1.0 mm length, a flocking adhesive layer of 50% solid content and 0.4 mm thickness, a film primary backing with thickness of 0.03 mm, and an open-cell foam secondary backing with thickness of 5.0 mm has an approximate overall thickness of about 6.0 mm.

EXAMPLE IV

A preferred embodiment of the present invention is a floor mat construction shown in FIG. 1 with a thin polycarbonate film as the primary backing, and is made by the following procedure.

Step 1. Prepare a flocking adhesive using the following materials:

| Raw Materials and Sources | Parts Product |
| --- | --- |
| Emulsion E-821 Acrylic Latex (60% solids) (Rohm and Haas Co.) | 90.7 |
| Nopco ® DF 160L Silicone Defoamer (Diamond Shamrock) diluted with equal weight of water | 0.6 |
| Acrysol ® ASE-60 Polyacrylic Acid Thickener (28% solids) (Rohm and Haas Co.) further diluted with equal weight water | 6.2 |
| NH₄NO₃ (25% aqueous solution) Catalyst (Fisher Scientific Co.) | 1.8 |
| NH₄OH (28% aqueous solution) Neutralizer (Fisher Scientific Co.) | Until pH of mixture is 8.5 |

The above ingredients are added with mixing in the order listed until a creamy mixture is obtained. This flocking adhesive, when made into film and dried at 105° C. for 7 minutes and cured at 138° C. for 3 minutes, has a water contact angle of 46°±2° which denotes that it is hydrophilic.

Step 2. Prepare a pressure sensitive adhesive as set out in Example III.

Step 3. Coat uniformly a 61 cm × 92 cm piece of carrier paper with about 30 g of the flocking adhesive of Step 1 using a paint roller.

Step 4. Transfer the adhesive to the foam secondary backing 5 by placing a 61 cm × 92 cm piece of 3.2 mm thick open-cell polyurethane ether foam of 0.02 g/cm³ density and having about 30 pores per linear centimeter, manufactured by the E. R. Carpenter Co., Richmond, Va., onto the adhesive coated carrier paper and apply light pressure on the foam backing 5 using a 61 cm × 92 cm plexiglass template, then remove the foam backing 5 from the carrier paper. The amount of adhesive transferred to the foam secondary backing 5 is about 15 g.

Step 5. Place a 61 cm × 92 cm piece of 0.0254 mm thick Lexan ® polycarbonate film (primary backing 3) manufactured by the General Electric Co., Pittsfield, Mass., onto the adhesive coated polyurethane foam surface of Step 4, and smooth out the wrinkles with a roller to provide a laminate.

Step 6. Dry the adhesive of Step 5 laminate in a forced air oven for 7 minutes at 105° C., then let the structure cool to room temperature.

Step 7. Tape the laminate of Step 6 to a flat plate with the primary backing 3 film side up and coat it with a layer of the flocking adhesive 2 of Step 1 of about 0.33 mm thick using a #40 meyer rod, and quickly hand the plate vertically; then electrostatically flock the structure with precision cut 0.9 mm–3 denier acrylic fibers made by Microfibres, Inc., using a hand-held flocker Model 7301, manufactured by Ero-Floc Co., West Germany, and distributed by the Dekor Flocking Co., Middletown, N.Y. The flock coverage is about 10 mg/cm$^2$.

Step 8. Place the flocked laminate into a forced air oven for 7 minutes at 105° C. and then for 3 minutes at 138° C. to cure the adhesive.

Step 9. The sample is then vacuumed with a Kenmore brand household vacuum cleaner (Model 116.2694 available from Sears, Roebuck and Company) to remove nonadhered flock fibers. The face fiber density after vacuuming is about 22,500 fibers/cm$^2$ (6.8 mg/cm$^2$).

Step 10. Kiss coat the PSA of Step 2 mostly onto the tips of the exposed open-cell polyurethane foam surface by following the general procedure of Steps 3 and 4, using about 5 g of PSA and curing the PSA in the forced air oven for 3 minutes at 150° C.

Step 11. Cut the construction into a mat of 53 cm×86 cm dimension with a die stamp.

With a fiber 1 length of 0.9 mm, a flocking adhesive 2 layer of 0.33 mm thick (and 60% solid content), a primary backing film 3 thickness of 0.0254 mm, and a foam secondary backing 5 thickness of 3.2 mm, the estimated overall thickness of the floor mat of Example IV is 4.1 mm, and was found experimentally to be 4 mm.

The floor mat of Example IV had an initial COF of 4.6 and the COF at 4 weeks was 2.2 on vinyl asbestos tile. (A similar floor mat, but without the PSA, had a COF of about 0.7 throughout the testing.) The COF was 3.3 on short loop carpet and 3.1 on shag carpet. This floor mat had excellent wet soil absorbency, good door clearance and superior hard and carpeted floor stability.

EXAMPLE V

In this example the primary backing 3 of the floor mat is a thin nonwoven substrate.

Step 1. The flocking adhesive mixture of Example I is evenly knife-coated into a layer of about 0.5 mm thick onto a 61 cm×95 cm piece of a nonwoven primary backing. The nonwoven material is a white polyester nonwoven substrate, sold under the name of Confil ®1120F, of 8.9 mg/cm$^2$ basis weight, obtained from International Paper Company, Formed Fabrics Division, Lewisburg, Pa.

Step 2. The adhesive-coated primary backing is then quickly hung on a vertical metal ground plate with the adhesive-coated side exposed.

Step 3. Precision-cut, 3 denier, 1 mm nylon flock is then applied at a coverage of about 10 mg/cm$^2$, using the Ero-Flock ® hand-held electrostatic flocker.

Step 4. The sample is dried and adhesively cured for 10 minutes at 121° C. in a forced air oven.

Step 5. The sample is then vacuumed with a Kenmore brand household vacuum cleaner to remove nonadhered flock fibers. The face fiber density after vacuuming is about 6.8 mg/cm$^2$, which is about 20,000 fibers/cm$^2$.

Step 6. Prepare a laminating adhesive using the following materials:

| Raw Materials and Sources | Parts Product |
|---|---|
| Rhoplex ® HA-8 Acrylic Latex (Rohm and Haas Co.) | 91 |
| Acrysol ® ASE-60 Polyacrylic Acid Thickener (28% solids) (Rohm and Haas Co.) further diluted with equal weight of water | 9 |
| NH$_4$OH (28% aqueous solution) Neutralizer (Fisher Scientific Co.) | Until pH of mixture is 8.5 |

Step 7. Coat uniformly the unflocked side of the sample of Step 5 with about 30 grams of the laminating adhesive of Step 6 using a paint roller.

Step 8. Laminate a 61 cm×95 cm piece of thin polyurethane foam onto the adhesive coated side of the sample of Step 7, and smooth out the laminate with a roller. Foam material used is 1.6 mm thick open-cell polyurethane ether foam of 0.02 g/cm$^3$ density and having about 30 pores per linear centimeter, manufactured by E. R. Carpenter Co.

Step 9. Dry the adhesive of Step 8 laminate in a forced air oven for 7 minutes at 105° C.

Step 10. Apply and cure the PSA of Example III to the exposed side of the polyurethane foam following the procedures of Step 10 of Example IV.

Step 11. Cut the construction into a mat of 53 cm×86 cm dimension with a die stamp.

This floor mat has excellent wet soil absorbency, good door clearance and superior hard and carpeted floor stability.

What is claimed is:

1. A floor mat comprising a thin, flexible polymeric film primary backing, a flocking adhesive, and assembled flock fibers, the fibers being bonded to the primary backing with the flocking adhesive; wherein the film is a water-impermeable, polymeric film, said film being dimensionally stable under flocking adhesive curing conditions; wherein the flexible polymeric film is selected from the group consisting of polycarbonate, nylon, polyester, polypropylene, and other suitable flexible films, said film having a thickness of at least 0.005 mm, and wherein said adhesive is coated on said film at a thickness of at least 0.1 mm prior to flocking, and wherein the fibers are flocked onto the film at a level of from about 1,000 to about 40,000 fibers/cm$^2$; the fibers having lengths of from 0.4 mm to about 10 mm and a denier of from 1.5 to about 80, and wherein the flocking adhesive is cured, and the cured adhesive has a water contact angle of from 0° to 70°.

2. The invention of claim 1 wherein the polymeric film has a thickness of from 0.01 mm to 0.075 mm, and wherein the flocking adhesive is coated onto the film at a thickness of from 0.1 mm to 1.5 mm prior to flocking, and wherein the fibers are flocked onto the film at a level of from 8,000 to 30,000 fiber/cm$^2$; the fibers having lengths of from 0.75 mm to 2.5 mm and a denier of from 2 to 10, and wherein the flocking adhesive has a water contact angle of from 0° to 50°.

3. The invention of claim 2 wherein the polymeric film is a polycarbonate film having a thickness of from about 0.01 mm to about 0.03 mm; the flocking adhesive is coated onto the film at a thickness of from 0.1 mm to 0.5 mm, wherein the fibers are flocked onto the coated film at a level of from 15,000 to 25,000 fiber/cm$^2$, the fibers having lengths of from 0.75 mm to 1.0 mm and a denier at 2 to 4; and wherein the flocking adhesive has a water contact angle of 0° to 40°.

4. The invention of claim 1 wherein the polymeric film is laminated onto one side of a secondary backing substrate.

5. The invention of claim 4 wherein the secondary backing is a polymeric foam sheet having a thickness of at least 0.5 mm.

6. The invention of claim 5 wherein the secondary backing is an open-cell polyurethane foam having a density of from about 0.015 g/cm$^3$ to about 0.05 g/cm$^3$, and a thickness of from about 1 mm to about 10 mm.

7. The invention of claim 6 wherein a pressure sensitive adhesive is applied to the unlaminated side of the secondary backing substrate.

8. The invention of claim 7 wherein said pressure sensitive adhesive is kiss coated to said unlaminated side and wherein the pressure sensitive adhesive provides a mat coefficient of friction value of from 1 to 8.

9. The invention of claim 8 wherein the pressure sensitive adhesive provides a mat coefficient of friction value of from 2 to 5.

10. The invention of claim 8 wherein the secondary backing has a density of from 0.017 g/cm$^3$ to 0.03 g/cm$^3$, a porosity of 20 to 40 pores per linear centimeter, and a thickness of from 1.5 mm to 4 mm.

11. The invention of claim 4 wherein said mat has a thickness of from 2 mm to 10 mm.

* * * * *